United States Patent
Hageman et al.

(10) Patent No.: US 6,578,933 B2
(45) Date of Patent: Jun. 17, 2003

(54) VEHICLE BRAKE BY WIRE ACTUATOR

(75) Inventors: John B. Hageman, Vandalia, OH (US); Paul Rymoff, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/841,151

(22) Filed: Apr. 24, 2001

(65) Prior Publication Data

US 2002/0153769 A1 Oct. 24, 2002

(51) Int. Cl.[7] .................................................. B60T 8/36
(52) U.S. Cl. .................... 303/119.1; 303/115.2
(58) Field of Search .................... 303/119.1, 119.2, 303/115.1, 115.2, 115.4, 115.5, 116.1, 116.2, 20, DIG. 1, DIG. 2

(56) References Cited

U.S. PATENT DOCUMENTS

| | | | | | |
|---|---|---|---|---|---|
| 5,000,523 | A | * | 3/1991 | Mikhaeil-Boules et al. . | 303/115 |
| 5,042,885 | A | * | 8/1991 | Villec ........................... | 303/110 |
| 5,147,117 | A | * | 9/1992 | Quinn ...................... | 303/115.2 |
| 5,716,111 | A | * | 2/1998 | Schenk et al. ........... | 303/116.4 |
| 6,030,055 | A | * | 2/2000 | Schubert ..................... | 303/10 |
| 6,082,831 | A | * | 7/2000 | Hageman et al. ........ | 303/115.2 |
| 6,305,758 | B1 | * | 10/2001 | Hageman et al. ........ | 303/115.2 |

* cited by examiner

Primary Examiner—Pam Rodriguez
(74) Attorney, Agent, or Firm—Scott A. McBain

(57) ABSTRACT

An actuator assembly for a vehicle brake system comprises a piston disposed in a bore, a reservoir, and a solenoid. A channel is in fluid communication between the bore and the reservoir, and the solenoid is disposed in the channel. The solenoid is movable between an open position and a closed position. In the closed position, the solenoid blocks fluid communication between the bore and the reservoir.

20 Claims, 1 Drawing Sheet

VEHICLE BRAKE BY WIRE ACTUATOR

TECHNICAL FIELD

This invention relates to vehicle brake by wire systems, and more particularly to an actuator for use in a vehicle brake by wire system.

BACKGROUND OF THE INVENTION

Vehicle braking systems, especially automotive braking systems, have typically been hydraulic-based. Hydraulic systems convert fluid pressure into linear and/or mechanical motion. Such systems allow the source of the hydraulic pressure to be positioned remotely from the cylinders that effect the braking action. These systems normally include an actuator, such as a brake pedal, reservoir fluid (such as in a master cylinder) which is responsive to pressure applied by the actuator, and means such as fluid cylinders for converting the hydraulic pressure to a braking force. Mechanical braking pressure is achieved by utilizing the force of the depression of the brake pedal by the driver to increase the pressure on the master cylinder. Such systems are typically accompanied by a vacuum boost that multiplies the force supplied to the brake pedal, throughout the braking operation. The increased pressure in the master cylinder is then transmitted through fluid lines to the fluid cylinders. The fluid cylinders operate calipers, thereby forcing the calipers and brake pads against the rotors and/or drums which slows the vehicle by frictional force.

Hydraulic systems of this type have several disadvantages. The master cylinder, vacuum booster, ABS modulator and hydraulic lines all take up space and add weight to the completed vehicle. Installation of standard hydraulic braking systems is also complicated and labor intensive. Additionally, the large number of parts and installation also adds to repair and maintenance issues as individual parts reach the end of their useful life.

A variant form of applying a vehicle brake system is referred to as a brake by wire (BBW) system. BBW describes the ability to activate vehicle wheel brakes via an electric signal generated by an onboard processor/controller as a result of input signals thereto. Brake torque is applied to the wheels without direct mechanical interaction between the vehicle's brake pedal and the wheel brake.

A particular type of BBW systems is known as a "dry interface corner" (DIC) system. The DIC system is known as a hybrid system, in that electric signals are used to generate the type and amount of braking force required at each wheel of the vehicle with electrical wires rather than standard hydraulic brake lines. The typical DIC system operates when a driver inputs a force to the brake pedal. A force sensor and travel sensor attached to the pedal transmits an electronic signal to an electronic controller, which in turn sends the signal to a self-contained braking module typically located at each wheel of the vehicle. The self-contained braking module takes the electrical signal and mechanically brakes the vehicle. The self-contained module utilizes an individual motor that drives a ball screw piston assembly, which in turn pressurizes hydraulic brake fluid to ultimately apply the brake caliper to a rotor at that corner of the vehicle. Such a DIC system significantly reduces assembly cost. The individual modules can be separately assembled and fluid filled prior to the manufacture of the vehicle. DIC modules then only need to be bolted to the automobile during the assembly process and plugged in using standard electrical connections. Thus, reliability and quality control of the overall brake system is also increased. Finally, the elimination of hydraulic lines stretching throughout the vehicle as well as the elimination of the master cylinder, booster, and ABS modulator reduces space requirements within the engine compartment.

A DIC brake actuator normally has a fluid reservoir that is used to compensate for long term brake lining wear. Acuators of this type are described in patent application Ser. No. 09/769,644 and patent application Ser. No. 09/792,727, now U.S. Pat. No. 6,298,961, both of which are assigned to the assignee of the present invention and hereby incorporated by reference. When the actuator in these systems in at a released position, the reservoir communicates to a bore of the actuator through a bypass hole. When the actuator piston is applied, no fluid is displaced to the wheel brake until the bypass hole is covered by a seal of the actuator piston.

SUMMARY OF THE INVENTION

The present invention is an actuator assembly for a vehicle brake system. The actuator assembly comprises a piston disposed in a bore, a reservoir, and a solenoid. A channel is in fluid communication between the bore and the reservoir, and the solenoid is disposed in the channel. The solenoid is movable between an open position and a closed position. In the closed position, the solenoid blocks fluid communication between the bore and the reservoir.

Because the time required to activate the solenoid is less than the time needed to initiate braking, there is no displacement loss at the beginning of a brake event, and response time is improved. The present invention also improves anti-lock braking system control on low coefficient surfaces. Additionally, the present invention simplifies the overall hardware configuration of a BBW system, and in particular eliminates the need in systems with bypass holes to closely control part tolerances in order to ensure proper closure of the bypass holes.

These and other features and advantages of the invention will become further apparent from the following detailed description of the presently preferred embodiments, read in conjunction with the accompanying drawings. The detailed description and drawings are merely illustrative of the invention rather than limiting, the scope of the invention being defined by the appended claims and equivalents thereof.

DESCRIPTION OF THE PRESENTLY PREFERRED EMBODIMENTS

Figure 1:
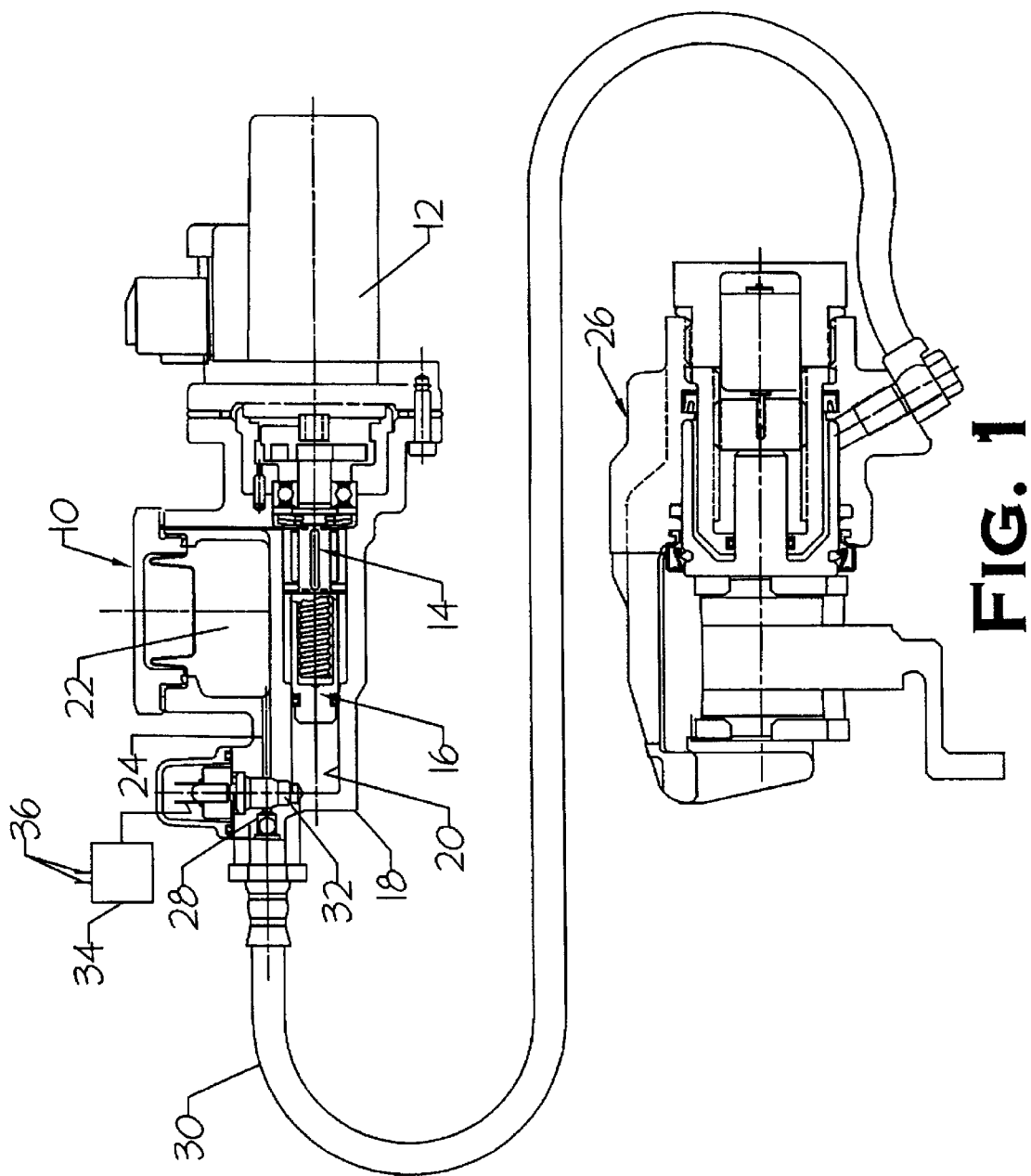
FIG. 1 shows an actuator assembly according to the present invention for use with a vehicle wheel brake assembly.

The Dry Interface Corner (DIC) brake system shown in FIG. 1 includes an independent hydraulic actuator assembly 10 for each wheel brake assembly. The actuator assembly 10 includes a motor 12 that drives a gear mechanism and a ballscrew assembly 14, which in turn applies and releases a hydraulic piston 16 in an actuator body 18. The actuator body 18 includes a bore 20 that communicates with a brake fluid reservoir 22 through a channel 24. The actuator assembly 10 is in hydraulic communication with the wheel brake assembly 26 through a bore outlet 28 and a brake pipe or hose 30. When the actuator assembly 10 is at the brake-released position, the brake fluid path between the wheel brake and the actuator fluid reservoir 22 is open. This allows brake fluid to flow to and from the fluid reservoir 22 due to brake fluid expansion and contraction as a result of temperature change and brake fluid compensation due to brake lining wear.

A solenoid 32 is situated in the end of the actuator bore 20 proximate the bore outlet 28. The solenoid 32 is normally open, allowing fluid communication and compensation between the actuator reservoir 22 and the bore 20. At the onset of brake apply, a controller 34 closes the solenoid 32 and isolates the reservoir 22 from the rest of the brake system until the vehicle operator releases the brake pedal. The inputs 36 to control the solenoid 32 are preferably the same switches and sensors used to respond to driver input to initiate braking. As described above, the inputs 36 include a force sensor and a travel sensor attached to the pedal.

Because the time required to activate the solenoid 32 is less than the time needed to initiate motion of the piston 16 and thereby initiate braking, there is no displacement loss at the beginning of a brake event, and response time is improved. The present invention also improves anti-lock braking system control on low coefficient surfaces. Additionally, the present invention simplifies the overall hardware configuration of a BBW system, and in particular eliminates the need in systems with bypass holes to closely control part tolerances in order to ensure proper closure of the bypass holes.

While the embodiments of the invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. An actuator assembly for a vehicle brake system, the actuator assembly comprising:
   a piston disposed in a bore;
   a reservoir;
   a channel in fluid communication between the bore and the reservoir;
   a two-way solenoid disposed in the channel, the solenoid being movable between an open position and a closed position, the solenoid in the closed position extending into the bore and blocking fluid communication between the bore and the reservoir; and
   a controller which receives sensed driver information and determines a signal to the solenoid.

2. The actuator assembly of claim 1 wherein the solenoid is normally open.

3. The actuator assembly of claim 1 wherein the solenoid moves to the closed position in response to a braking event.

4. The actuator assembly of claim 1 wherein the solenoid moves to the closed position in response to input from an operator of the vehicle.

5. The actuator assembly of claim 1 further comprising a controller for moving the solenoid to the closed position.

6. The actuator assembly of claim 1 further comprising a controller for moving the solenoid to the open position.

7. The actuator assembly of claim 1 wherein the reservoir provides fluid to compensate for changes in temperature.

8. The actuator assembly of claim 1 wherein the reservoir provides fluid to compensate for brake lining wear.

9. An actuator assembly for a vehicle brake-by-wire system, the actuator assembly comprising:
   a piston disposed in a bore;
   a reservoir;
   a channel in fluid communication between the bore and the reservoir;
   a two-way solenoid disposed in the channel, the solenoid being movable between an open position and a closed position; and
   a controller, which receives sensed driver information, and determines a signal to move the solenoid to the closed position extending into the bore and blocking fluid communication between the bore and the reservoir.

10. The actuator assembly of claim 9 wherein the solenoid is normally open.

11. The actuator assembly of claim 9 wherein the solenoid moves to the closed position in response to a braking event.

12. The actuator assembly of claim 9 wherein the controller moves the solenoid to the closed position in response to input from an operator of the vehicle.

13. The actuator assembly of claim 9 wherein the controller moves the solenoid to the open position in response to input from an operator of the vehicle.

14. The actuator assembly of claim 9 wherein the reservoir provides fluid to compensate for changes in temperature.

15. The actuator assembly of claim 9 wherein the reservoir provides fluid to compensate for brake lining wear.

16. An actuator assembly for a vehicle brake-by-wire system, the actuator assembly comprising:
   a piston disposed in a bore;
   a reservoir;
   a channel in fluid communication between the bore and the reservoir;
   a two-way solenoid disposed in the channel, the solenoid being movable between a normally open position and a closed position; and
   a controller for moving the solenoid to the closed position in response to a braking event, the solenoid in the closed position extending into the bore and blocking fluid communication between the bore and the reservoir, the controller receiving driver information including force applied to a pedal and travel of the pedal.

17. The actuator assembly of claim 16 wherein the controller moves the solenoid to the closed position in response to input from an operator of the vehicle.

18. The actuator assembly of claim 16 wherein the controller moves the solenoid to the open position in response to input from an operator of the vehicle.

19. The actuator assembly of claim 16 wherein the reservoir provides fluid to compensate for changes in temperature.

20. The actuator assembly of claim 16 wherein the reservoir provides fluid to compensate for brake lining wear.

* * * * *